Dec. 3, 1968          L. R. ALLEN          3,414,655
APPARATUS FOR EVAPORATION OF LOW TEMPERATURE SEMICONDUCTOR
MATERIAL BY ELECTRON BEAM IMPINGEMENT ON THE MATERIAL
AND COMPRISING MEANS FOR DRAINING ELECTRIC
CHARGE FROM THE MATERIAL
Filed Jan. 26, 1966

United States Patent Office 3,414,655
Patented Dec. 3, 1968

3,414,655
APPARATUS FOR EVAPORATION OF LOW TEMPERATURE SEMICONDUCTOR MATERIAL BY ELECTRON BEAM IMPINGEMENT ON THE MATERIAL AND COMPRISING MEANS FOR DRAINING ELECTRIC CHARGE FROM THE MATERIAL
Lloyd R. Allen, Belmont, Mass., assignor to National Research Corporation, Cambridge, Mass., a corporation of Massachusetts
Filed Jan. 26, 1966, Ser. No. 524,962
3 Claims. (Cl. 13—1)

ABSTRACT OF THE DISCLOSURE

Electron beam evaporation of boron and other low temperature semiconductor material is facilitated by use of a grounding stud to drain charge which accumulates on the zone of the material struck by the electron beam.

---

The present invention relates to the heating of metals in vacuum by electron beam impingement and particularly to electron beam vaporization of boron on a continuous or semi-continuous basis.

Vaporization of substances in vacuum by electron beam impingement is described generally in U.S. Patent 2,423,729 to Ruhle. Vacuum evaporation of boron has been described by Flinta, 2 Vacuum 257 (1952). The boron is contained in a carbon source, and heated by resistance. It is well known in the art that boron evaporation does not produce boron vapors of high purity because high temperatures are necessary to evaporate boron and boron reacts with the container material at high temperatures. One way of circumventing this problem is to evaporate boron by the technique of impinging an electron beam on a target within the boron charge so that the high temperature target zone is spaced from the boron charge-container interface. However, the use of the electron beam method for production of relatively pure boron vapors at economic production rates has not been successfully applied heretofore. Electron beam evaporation of boron is described by Hill in 27 Review of Scientific Instruments 1086 (1956) and Erdman et al. 35 id. 122–123 (1964).

The electron beam evaporation process must be held to slow rates and only very limited duration of an evaporation run is possible in the prior art process. Yet, there is a need for boron of high purity in continuous forms such as deposits on wires or ribbons or sheet substrates or as self supporting filaments, fibers, flakes, sheets or ribbons. Such materials would find use in a variety of structural applications in view of the well-known strength, stiffness, strength/weight ratio, stiffness/weight ratio, neutron adsorption and hardness characteristics of boron. For instance, boron filaments or fibers can be used in reinforced structures (see e.g. Mullen, pp. 38–41, September 1965 issue of Research Development magazine). When boron is produced by evaporation from resistance, or induction, arc or poorly focussed electron beam sources, the resultant boron deposits are so contaminated that the above utility of boron is limited. Boron filaments are obtained from chemical deposition techniques only at high expense. When boron is evaporated in a well-focussed electron beam system, problems develop in the evaporation source because of the peculiar conductivity characteristics of boron. At room temperature, high purity boron is a semiconductor, becoming a metallic conductor at 600° C. or above. When a well-focussed beam of electrons impinges on a charge of boron, a molten zone forms at the region of beam impingement and has a temperature of about 2000–2400° C. The remainder of the solid boron charge has a temperature gradient which drops to well below 600° C. at the boron/container interface. This is desirable from the standpoint of maintaining purity and strength of the resultant deposit, but raises the problem that electric charge accumulates in the molten pool. This charge tends to deflect or defocus the beam and also results in distortion of the melt surface. Also a wall of solid boron is formed at the edges of the melt and this wall closes in over the melt gradually reducing the effective source area.

Such problems do not occur in runs of short duration or when the boron charge is contaminated. The cold resistance of boron is decreased manyfold by the addition of carbon; the addition of 7–8% carbon results in a conductivity equivalent to that of carbon (Hampel, "Rare Metals Handbook," p. 78).

Having recognized the problem and its approximate mechanism, I have provided a simple solution in the form of a conductive rod within the evaporation container for draining charge from the melt to the grounded container. As a result, I have been able to double the time length of vaporization runs without excessive build-up of solid boron around the edge of the melt. It is also possible to increase the rate of evaporation of boron through the use of my invention.

The invention has application to other low temperature semiconductors such as silicon, germanium, silicon carbide, boron phosphide, gallium arsenide, zirconia and other metals, metalloids and ceramics. The term, low temperature semiconductor, as used herein, comprehends the above materials and other materials which have very high resistance at room temperature but are essentially conductive in the liquid state or at temperatures used for the rapid vaporization thereof. Many of these materials have been evaporated and produced as thin films in the microcircuitry art. The present invention opens the way for production of thick films of such materials for use as structural reinforcing filaments and other purposes. Evaporation of low temperature semiconductors can also be used in industrial processes other than vacuum deposition. The evaporated material can be condensed as fine powders as taught in my prior patent (with Baer and Clough), 3,049,421. In some instances, an adaptation of this heating process may be used for metal refining; usage of electron beam melting process for refining is generally known already (see e.g. Hanks et al. U.S. 2,880,483).

It is therefore a general object of the invention to provide improved apparatus for electron beam heating of low temperature semiconductors, particularly boron.

It is a further and more specific object of the invention to provide improved apparatus for continuous production of thick films of low temperature semiconductors, particularly boron, by vapor deposition from electron beam heated sources.

The invention accordingly comprises the improvement apparatus combination and improvement in the crucible subcombination, the scope of application of which are limited only as set forth in the claims.

Other objects, features and advantages of the invention will, in part, be obvious and will in part appear hereinafter.

The invention is now described with respect to working embodiments thereof, the description being made with reference to the accompanying drawings wherein.

Figure 1:
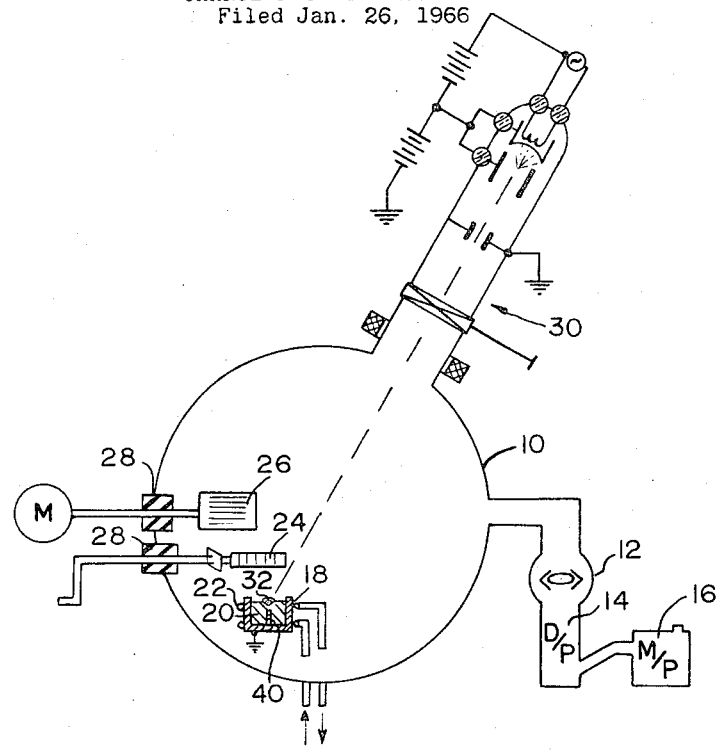
FIG. 1 is a schematic diagram of electron beam coating apparatus.

Referring now to FIG. 1, the apparatus comprises a vacuum chamber 10 evacuated via a cold trap 12, a diffusion pump 14 and mechanical pump 16. A copper crucible 18 is mounted in the chamber 10. A charge 20 of boron is contained in the crucible. A tantalum rod-like stud 50 extends from the crucible to the upper central portion of the charge. The crucible is cooled by coolant coils 22 which circulate water to limit the crucible temperature. The crucible is electrically grounded. Above the crucible are a shutter 24 and a substrate support roller 26. Both the shutter and roller can be driven from outside the vacuum chamber 10 via vacuum seals 28. The roller 26 is cooled via conventional coolant means (not shown) to protect heat sensitive substrates which are to be coated with boron.

A self-accelerated electron beam gun 30 of the type described in U.S. Patent 3,005,859 to Candidus directs a focussed beam of electrons to a target zone within the crucible wherein a boron melt 32 is formed. Boron evaporates at a high rate from the target zone. The stud 50 is designed and positioned to extend towards the melt, but terminating short of the melt.

Figure 2:
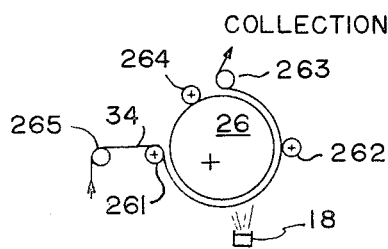
FIGS. 2 and 3 are diagrams of the substrate supporting rolls in the coating apparatus for coating one side of a film (FIG. 2), then the other.
Figure 3:
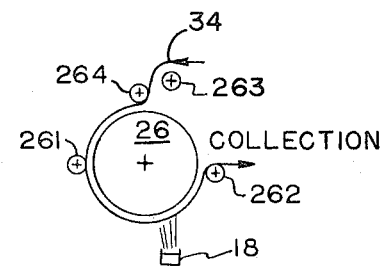

FIG. 2 shows the cooled substrate roll 26 during a coating run. Adjacent auxiliary rolls 261, 262, 263, 264 are provided around the substrate roll. A substrate 34 (e.g. plastic film) is fed over roll 26 with the auxiliary rolls 261, 263 serving as pinch rolls and one side is coated. Then the substrate is fed back over roll 26 as shown in FIG. 3 to coat the other side. During both phases, the substrate 34 is held tight against the cooling roll 36. Typically, a spacing of 15 inches between the crucible 18 and the nearest point of roll 26 is used when the substrate is H film in order to avoid damage to the coated substrate.

Typical operating conditions of the coating apparatus are that the chamber pressure is held to $10^{-6}$ torr by the pumps, the power supplied to the gun 30 is 10–20 kilowatts, the coolant temperature is 60–200° C. and the substrate speed is between .2 and 2 feet per minute. Coating runs of over an hour can be routinely conducted. Before the actual coating run begins, the shutter 24 is held above the crucible until evaporation conditions are stabilized. Then the shutter is moved aside.

Figure 4:
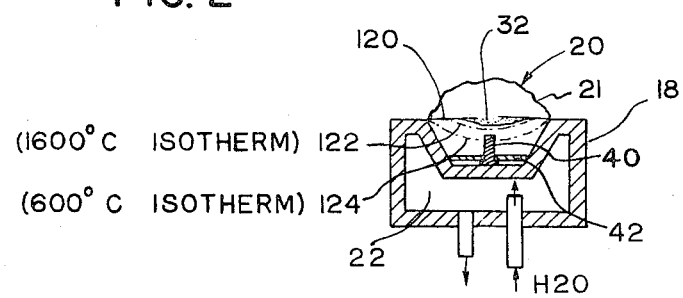
FIG. 4 is a sectional view of a preferred form of the crucible showing the location of the conductive rod relative to the melt portion of the charge.

Referring now to FIG. 4, the crucible 18 is shown in more detail. The charge 20 is composed of commercially available boron in the form of ¼ inch to ½ inch lumpy crystals produced from boron trichloride by the Van Arkel process. The boron purity is about 98.5%. The initial height of the charge is indicated by the line 21. After heating starts, the top of the charge sinks to the line indicated as 120 as a substatinal portion of the charge is consolidated in the melt 32. Approximate isotherms during heating are indicated by the chain lines 122 and 124—600° C. and 1600° C., respectively. The melt is at about 2000 to 2400° C.

The rod-stud 40 extends from the copper wall to a portion of the charge between isotherms 122, 124. If the rod end were much closer to the melt, the rod material would react with boron. If the rod end were much further away from the melt, it could not drain the charge effectively.

The conduction between rod 40 and the crucible is enhanced by a tungsten washer which fits tightly against the bottom of the crucible and wedges the rod stud head against the crucible for good contact.

What is claimed is:

1. An improvement in apparatus for electron beam heating of low-temperature semiconductors comprising combination:
    (a) means forming a container for the low temperature semiconductor;
    (b) means for directing a focussed electron beam to a limited target zone within the container to heat the low-temperature semiconductor material in said zone to the high temperature range of electrical conductivity.
    (c) means, in addition to said means (a), for draining accumulated electrical charge from the target zone;
    (d) said means (c) extending into said means (a) toward said target zone.

2. The apparatus of claim 1 wherein the means (a) is a conductive crucible and wherein the means (c) is a conductive rod-like member extending from the crucible toward the target zone.

3. The apparatus of claim 2 wherein the member terminates short of the target zone.

References Cited

UNITED STATES PATENTS

| | | |
|---|---|---|
| 3,087,211 | 4/1963 | Howe _____ 13—31 XR |
| 3,183,563 | 5/1965 | Smith. |
| 3,347,701 | 10/1967 | Yamagishi. |

BERNARD A. GILHEANY, *Primary Examiner.*

R. N. ENVALL, *Assistant Examiner.*